United States Patent
Yang et al.

(10) Patent No.: US 10,225,375 B2
(45) Date of Patent: Mar. 5, 2019

(54) NETWORKED DEVICE MANAGEMENT DATA COLLECTION

(71) Applicant: CA, Inc., New York, NY (US)

(72) Inventors: Yang Yang, Newton, MA (US); Zubing Robin Qin, Southborough, MA (US); Fei Gu, Newton, MA (US)

(73) Assignee: CA, Inc., New York, NY (US)

( * ) Notice: Subject to any disclaimer, the term of this patent is extended or adjusted under 35 U.S.C. 154(b) by 354 days.

(21) Appl. No.: 15/252,209

(22) Filed: Aug. 30, 2016

(65) Prior Publication Data

US 2018/0063290 A1  Mar. 1, 2018

(51) Int. Cl.
| | |
|---|---|
| *H04L 29/06* | (2006.01) |
| *H04L 29/08* | (2006.01) |
| *G06F 9/48* | (2006.01) |
| *G06F 9/455* | (2018.01) |
| *G06F 8/20* | (2018.01) |
| *G06F 9/46* | (2006.01) |
| *G06F 15/173* | (2006.01) |

(52) U.S. Cl.
CPC ............ *H04L 69/03* (2013.01); *G06F 9/4881* (2013.01); *H04L 67/00* (2013.01); *G06F 8/20* (2013.01); *G06F 9/45504* (2013.01)

(58) Field of Classification Search
None
See application file for complete search history.

(56) References Cited

U.S. PATENT DOCUMENTS

| | | | | |
|---|---|---|---|---|
| 2013/0067078 | A1* | 3/2013 | Banerjee | ................. H04L 41/04 709/224 |
| 2014/0089492 | A1* | 3/2014 | Nelson | .................. H04L 67/325 709/224 |
| 2016/0285957 | A1* | 9/2016 | Haserodt | ............. H04L 67/1097 |
| 2017/0161044 | A1* | 6/2017 | Singh | .................... G06F 9/5083 |

OTHER PUBLICATIONS

Chavan, et al., "Generic SNMP Proxy Agent Framework for Management of Heterogeneous Network Elements", First International Communication Systems and Networks and Workshops, COMSNETS 2009, Jan. 2009, 6 pages.

* cited by examiner

*Primary Examiner* — Eric C Wai
(74) *Attorney, Agent, or Firm* — Gilliam IP PLLC

(57) ABSTRACT

A data collection workflow architecture can streamline data collection from a heterogeneous network and leverage plug-ins of various technologies for data collection from the heterogeneous network. The data collection workflow architecture uses a workflow definition which is an abstracted series of data collection tasks. The workflow definition expresses the data collection tasks at a level abstracted away from the underlying implementation to increase the ease and efficiency of managing and maintaining data collections on a heterogeneous network. A workflow engine transforms each of the higher level expressions of data collections tasks into task definitions that can be passed to a plug-in engine. The task definition can be considered the abstracted process level expression of a data collection task with variable values injected into it. The plug-in engine hooks a task definition into an implementation of the task definition and executes or interprets the task definition implementation with the variable values.

20 Claims, 6 Drawing Sheets

NETWORKED DEVICE MANAGEMENT DATA COLLECTION

BACKGROUND

The disclosure generally relates to the field of data processing, and more particularly to multicomputer data transferring.

For management of devices in a network, a system manager collects data from the devices. Although data collection can be done according to the well-defined Simple Network Management Protocol (SNMP), not all devices support SNMP. In addition, a device may support SNMP for some but not all components and/or operational information of the device. Networked, managed devices can generally be divided into three groups: 1) SNMP compliant devices, 2) non-SNMP compliant devices, and 3) devices that are SNMP compliant but also have data for components and/or operational aspects that are not collected according to SNMP ("hybrid devices").

BRIEF DESCRIPTION OF THE DRAWINGS

Aspects of the disclosure may be better understood by referencing the accompanying drawings.

DESCRIPTION

Figure 1:
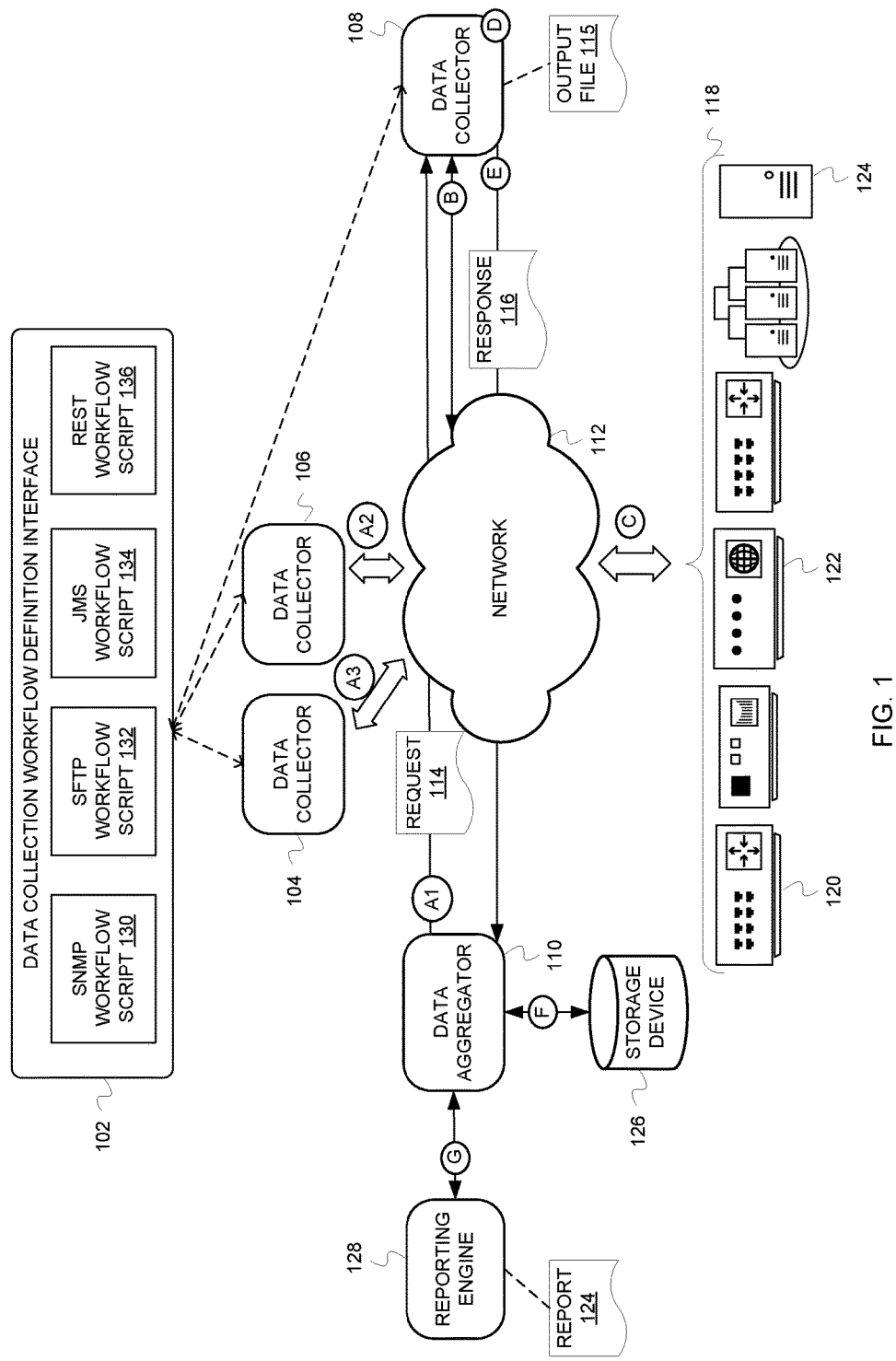
FIG. 1 depicts an example illustration of a unified data collection system leveraging workflow scripts for different protocols and technologies implemented on devices of a network.

The description that follows includes example systems, methods, techniques, and program flows that embody embodiments of the disclosure. However, it is understood that this disclosure may be practiced without these specific details. For instance, this disclosure refers to using the MVFLEX expression language ("MVEL") in illustrative examples. But aspects of this disclosure can use another expression language for embedded queries, such as the Object-Graph Navigation Language ("OGNL") and the Groovy programming language. In other instances, well-known instruction instances, protocols, structures, and techniques have not been shown in detail in order not to obfuscate the description.

Overview

Collection of data from a heterogeneous network that can include a combination of SNMP-compliant devices, non-SNMP compliant, and hybrid devices can be cumbersome and complicated. Network management solutions utilize disparate engines and/or software applications to collect data from devices in a heterogeneous network and to convert and/or normalize the collected data. Maintaining these disparate engines and/or applications is inefficient. For instance, a first team of engineers may be assigned to maintain the data collection and management of SNMP devices and one or more other teams of engineers for data collection and management of non-SNMP devices. Addressing customer requests or making updates involves cross-team collaboration, which can be disruptive and inefficient for the teams. This can also delay implementation of customer requests and updates.

A data collection workflow architecture can streamline data collection from a heterogeneous network and leverage plug-ins of various software technologies (e.g., communication protocols, programming languages, program environments, etc.) for data collection from the heterogeneous network. The data collection workflow architecture uses a workflow definition which is an abstracted series of data collection tasks. The workflow definition expresses the data collection tasks at a level abstracted away from the underlying implementation to increase the ease and efficiency of managing and maintaining data collections on a heterogeneous network. The data collection workflow architecture includes data collectors, each of which invokes a workflow engine to process a workflow definition indicated by a data collector. The workflow engine then transforms each of the higher level expressions of data collections tasks into task definitions that can be passed to a plug-in engine, which is invoked by the workflow engine. The task definition can be considered the abstracted process level expression of a data collection task with variable values injected. The plug-in engine hooks a task definition into an implementation of the task definition and executes or interprets the task definition implementation with the variable values. The task definition implementation is the program code to implement the data collection task.

A workflow script is defined in an interpreted programming language with functions/methods that call wrapper functions for particular plug-ins corresponding to a particular data collection task. Data collection tasks in a workflow script include data gathering and at least one of data conversion and measurement calculation (also referred to as metric calculation). Workflow scripts are deployed in a heterogeneous network for access by data collectors. The data collectors use a workflow engine to interpret the various workflow scripts. When invoked, a workflow engine interprets a workflow script to carry out the data collection task(s) of the workflow script. For each statement that includes a call to a function/method, the workflow engine determines a corresponding wrapper function. The wrapper function can also be written in the interpreted language of the workflow script or a programming language like the Java® programming language. The workflow engine then generates a plug-in definition by injecting the values of the variables defined in the workflow script according to a mapping of the variables into the wrapper function. The workflow engine passes the plug-in definition to a plug-in engine, which executes/interprets a plug-in implementation based on the plug-in definition. This allows for modularization of the plug-ins for the different data collection tasks and provides the flexibility that leverages multi-technology/protocol implementations of the various data collection tasks. Data collection can be managed and/or maintained with the workflow script independent of the underlying implementations.

Example Illustrations

FIG. 1 depicts an example illustration of a unified data collection system leveraging workflow scripts for different protocols and technologies implemented on devices of a network. A network management system monitors and manages objects of networked devices 118 (e.g., servers, routers, switches, etc.). The definition of an object will vary with the device and/or data collection technique. For instance, objects of a device can be the device itself, processors of the device, interfaces of the device, an application on the device, etc. In this illustration, the devices 118 include a router 120, a hybrid wireless modem 122, and a non-SNMP Element Management System (EMS) server 124. The depicted example network management system includes a data collection workflow definition interface 102, a data aggregator 110, a data collector 104, a data collector 106, and a data collector 108. Several workflow scripts have been created and deployed via the data collection workflow definition interface 102: an SNMP workflow script 130, a Secure File Transfer Protocol (SFTP) workflow script 132, a Java Message Service (JMS) workflow script 134, and a Representational State Transfer (REST) workflow script 136. Each workflow script may be developed for a specific protocol and/or network device. At least one or all of the workflow scripts in the data collection interface 102 is deployed to each of the data collectors 104, 106, and 108. The data aggregator 110 exchanges monitoring and control information about the managed resources 118 with the data collectors 104, 106, and 108. The data aggregator 110 sends data collection requests to the data collectors 104, 106, and 108. The data collectors 104, 106, and 108 are daemons or services that monitor for incoming data collection requests from the data aggregator 110. The data collectors 104, 106, 108 run on nodes of the network management system (e.g., computing devices that may be considered servers). In some cases, the same computing device may host the data aggregator 110 and one of the data collectors.

FIG. 1 is annotated with a series of letters A(A1-A3)-G. These letters represent stages of operations, each of which may be one operation or multiple operations. Although these stages are ordered for this example, the stages illustrate one example to aid in understanding this disclosure and should not be used to limit the claims. Subject matter falling within the scope of the claims can vary with respect to the order and some of the operations.

Prior to stage A1, the workflow scripts 130, 132, 134, and 136 have been deployed to the data collectors 104, 106, and 108. The data collection workflow definition interface 102 can be used to update and/or edit a workflow script. At stage A1, the data aggregator 110 sends a request 114 to the data collector 108. The request 114 contains information that identifies the SFTP workflow script 132. The request 114 may explicitly identify the SFTP workflow script 132 or identify a device(s) and attribute(s) that the data collector 108 resolves to the SFTP workflow script 132.

At stage B, the data collector 108 selects the SFTP workflow script 132 based on the request 114. The SFTP workflow script 132 identifies the router 120 as the device to gather data from. The router 120 utilizes the SFTP protocol in communicating with other devices and/or systems such as the network management system. The data collector 108 processes the SFTP workflow script 132. To process the SFTP workflow script 132, the data collector 108 invokes a workflow engine and a plug-in engine.

Figure 2:
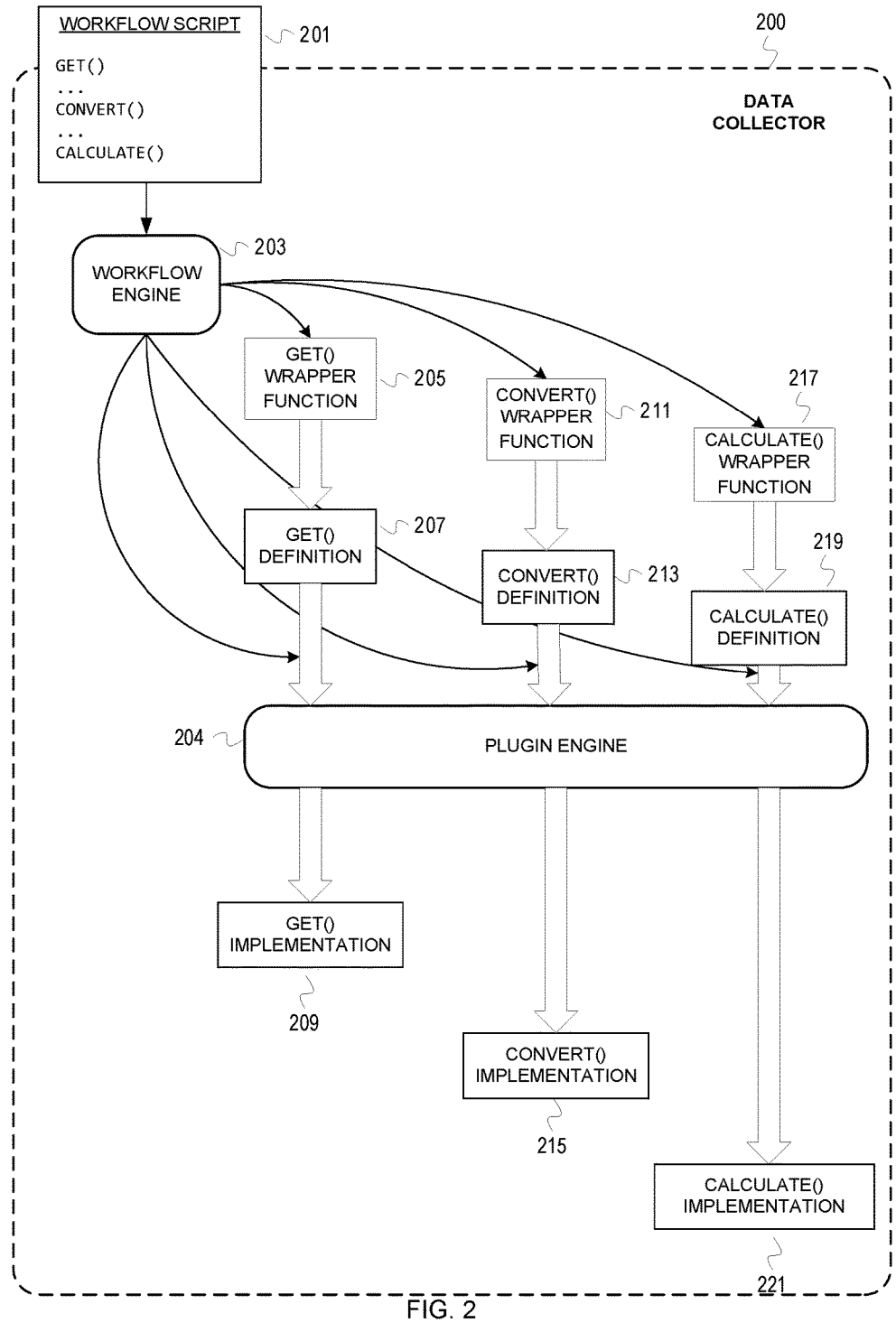
FIG. 2 depicts an example of a data collector processing a workflow script with a workflow engine and a plug-in engine.

FIG. 2 depicts an example of a data collector processing a workflow script with a workflow engine and a plug-in engine. An example workflow script 201 is selected by a data collector 200 based on a data collection request. The workflow script 201 does not identify a particular protocol or technology because FIG. 2 is provided as an initial introduction to the data collector architecture before referring to a specific protocol/technology. The data collector 200 invokes a workflow engine 203 to interpret the selected workflow script 201. The workflow engine 203 comprises an interpreter corresponding to the programming language of the workflow script 201. When the workflow engine 203 starts, it loads wrapper functions or references to wrapper functions that have been exposed to the workflow engine 203 (e.g., defined in a library, defined in a library file, or stored in a predefined path). As the workflow engine 203 interprets the workflow script 201, the workflow engine 203 will encounter calls to wrapper functions for different data collection tasks. The example workflow script 201 includes a call to a wrapper function for gathering data (identified as GET( )), a call to a wrapper function for converting data (identified as CONVERT( )), and a call to a wrapper function to calculate measurements or metric calculations (identified as CALCULATE( )). When the workflow engine 203 reads the statement that includes the call to GET( ), the workflow engine 203 loads a corresponding GET( ) wrapper function 205. The workflow engine 203 injects variables specified for the GET( ) in the workflow script 201 into the GET( ) wrapper function 205 to generate a GET( ) plug-in definition 207. The workflow engine 203 then invokes a plug-in engine 204 and passes the GET( ) plug-in definition 207 to the plug-in engine 204. The plug-in engine 204 calls the GET( ) implementation 209 using the values and/or information in the GET( ) plug-in definition 207. The plug-in engine 204 is instantiated from a program that resolves plug-in definitions to plug-in implementations. The plug-in engine 204 accesses information that maps plug-in definition names to program code or an executable/interpretable file that implements a specified plug-in. The information can be in a data structure loaded into memory based on a file that comprises the mappings. The plug-in engine 204 can be programmed to search a path(s) for a library(ies) of plug-in files based on the name of the plug-in definition.

The workflow engine 203 performs similar operations for the other wrapper functions detected in the workflow script 201, possibly passing along data from the preceding plug-in. When the workflow engine 203 reads the statement that includes the call to CONVERT( ), the workflow engine 203 loads a corresponding CONVERT( ) wrapper function 211. The workflow engine 203 injects variables into the CONVERT( ) wrapper function 211 to generate a CONVERT( ) plug-in definition 213. The injected variables can include the data gathered from the GET( ) plug-in implementation or a reference(s) to the gathered data. The workflow engine 203 then invokes the plug-in engine 204 and passes the CONVERT( ) plug-in definition 213 to the plug-in engine 204. The plug-in engine 204 calls the CONVERT( ) implementation 215 using the values and/or information in the CONVERT( ) plug-in definition 213. When the workflow engine 203 reads the statement that includes the call to CALCULATED, the workflow engine 203 loads a corresponding CALCULATE( ) wrapper function 217. The workflow engine 203 injects variables into the CALCULATE( ) wrapper function 217 to generate a CALCULATE( ) plug-in definition 219. The injected variables can include the converted data resulting from the CONVERT( ) plug-in implementation. The injected variables can also include data gathered from the GET( ) plug-in implementation. For example, the CONVERT( ) plug-in implementation may convert the format of the gathered data from comma separated value (CSV) format to an Extensible Markup Language (XML) format, and then the CALCULATE( ) plug-in implementation may perform metric calculations on specified values that can now be identified with the XML formatting. The workflow engine 203 then invokes the plug-in engine 204 and passes the CALCULATE( ) plug-in definition 219 to the plug-in engine 204. The plug-in engine 204 calls the CALCULATE( ) implementation 221 using the values in the CALCULATE( ) plug-in definition 219.

Figure 3:
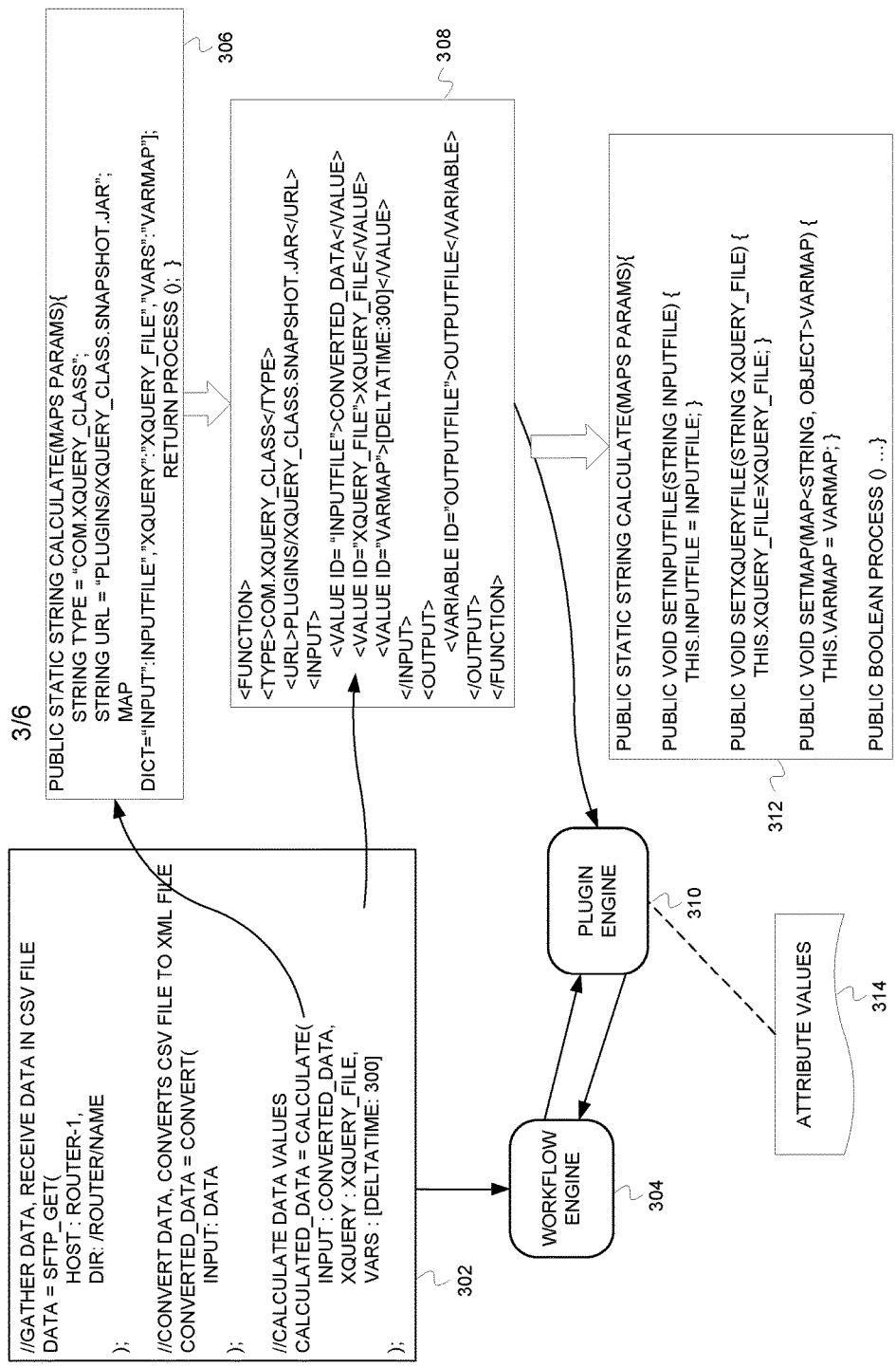
FIG. 3 depicts an example processing by the data collector of the SFTP workflow script of FIG. 1.

With the general introduction to the data collector portion of the architecture, a more specific example can be explained. FIG. 3 depicts this example processing by the data collector of the SFTP workflow script of FIG. 1. In FIG. 3, a workflow script 302 has example code for the SFTP workflow script 132 from FIG. 1. The data collector 108 invokes a workflow engine 304 to interpret the selected SFTP workflow script 302. This illustration depicts a workflow script 302 as an MVEL script that is used for data collection from the router 120 in FIG. 1. The workflow script 302 indicates the connection information (e.g., host, port, path) of the router 120, method/function names for the data collection, metric expressions to be calculated and the attribute values to be collected and used in calculating the metric expressions.

As the workflow engine 304 interprets the SFTP workflow script 302, the workflow engine 304 reads the first statement in the SFTP workflow script 302. The first statement is a function call to SFTP_GET( ). The function SFTP_GET( ) identifies the host name and the location of the files for download. The workflow engine 304 loads the corresponding SFTP_GET( ) wrapper function and generates the SFTP_GET( ) plug-in definition for the SFTP_GET( ) plug-in implementation. In this illustration, the retrieved file(s) from the network devices is in a CSV file format.

Returning to FIG. 1, at stage C, the router 120 responds with data gathered as specified in the SFTP workflow script 132. In particular, the router 120 transmits the data back to the data collector 108 in response to the data gathering request implemented by the SFTP_GET( ) plug-in implementation. The router 120 provides values to the data collector 108 in a file and/or several files in a CSV file format.

At stage D, the data collector 108 receives and processes the gathered data from the router 120 with the already invoked workflow engine 304. Processing the gathered data involves the other data collection tasks, such as data conversion and/or metric calculation. Data conversion involves but is not limited to, converting from one file format to another file format. (e.g., from a CSV file format to an XML file format). Data conversion may also involve converting from one data structure to another (e.g., from a map to an array) or from one unit of measure to another (e.g., from metric to English). The metric calculation involves computing measurements as defined in a workflow script or according to a plug-in. The measurements can be performance measurements, resource consumption measurements, etc.

Returning to FIG. 3, the workflow script 302 has example code for data conversion and calculation. The second statement in the SFTP workflow script 302 is a function call to the CONVERT( ) wrapper function. The function CONVERT( ) converts the retrieved CSV file to an XML file format. Conversion to an XML file allows the workflow engine 304 to retrieve the attribute values from the converted files. The third statement in the SFTP workflow script 302 is a call to the CALCULATE( ) wrapper function 306. As depicted in FIG. 3, the workflow engine 304 loads the CALCULATE( ) wrapper function 306. The workflow engine 304 generates a CALCULATE( ) plug-in definition 308 by injecting the values from the CALCULATE( ) function statement in the SFTP workflow script 302 into the variables in the CALCULATE( ) wrapper function 306 as defined by the variable mapping in the wrapper function 306. The wrapper function 306 defines the variable mappings with a map dictionary statement identified as "MAP DICT" in the wrapper function 306. The mapping statement maps the variables of the calling statement into the wrapper function 306 variables as follows: INPUT variable maps to the INPUTFILE variable, the XQUERY_FILE variable maps to the XQUERY_FILE variable, and the VARS variable maps to the VARMAP variable. After determining the variable mappings, the workflow engine 304 injects the values from the workflow script 302 into the CALCULATE( ) wrapper function 306 to generate the CALCULATE( ) plug-in definition 308. The workflow engine 304 determines that the value CONVERTED_DATA is assigned to the variable INPUT and creates the statement "<value ID="INPUTFILE">CONVERTED_DATA</value>" for the CALCULATE( ) plug-in definition 308 according to the mapping of INPUT to INPUTFILE. The workflow engine 304 does the same to inject the values XQUERY_FILE and [DELTATIME: 300] into the respective CALCULATE( ) plug-in definition 308 variables XQUERY_FILE and VARMAP.

After generating the CALCULATE( ) plug-in definition 308, the workflow engine 304 then invokes a plug-in engine 310 and passes the CALCULATE( ) plug-in definition 308 to the plug-in engine 310. The plug-in engine 310 calls a CALCULATE( ) implementation 312 using the values and/or information in the CALCULATE( ) plug-in definition 308. For example, the plug-in engine 310 would use the value CONVERTED_DATA from the INPUTFILE variable in the CALCULATE( ) plug-in definition 308 in mapping the INPUTFILE variable of the method SETINPUTFILE( ) in the CALCULATE( ) implementation 312.

The plug-in engine 310 uses the value XQUERY_FILE from the XQUERY_FILE variable in the CALCULATE( ) plug-in definition 308 in mapping the XQUERY_FILE variable of the method SETXQUERYFILE( ) in the CALCULATE( ) implementation 312. The plug-in engine 310 uses the value "[DELTATIME: 300]" of the VARMAP variable in the CALCULATE( ) plug-in definition 308 for the variable VARMAP in the function SETMAP( ) of the CALCULATE( ) implementation 312. Finally, If the workflow script does not have information regarding the output, the plug-in engine 310 uses the default value OUTPUTFILE as the output as depicted.

After injecting the values from the CALCULATE( ) plug-in definition 308 to the CALCULATE( ) plug-in implementation 312, the plug-in engine 310 executes the function CALCULATE( ) and extracts attribute values from the CONVERTED_DATA input file. The plugin-in engine 310 passes the extracted attribute values 314 to the XQUERY_FILE function. The XQUERY_FILE function contains an XQuery query and functional programming language functions to process the attribute values extracted from the CONVERTED_DATA XML file. Processing the extracted attribute values includes data normalization and computing the metric expressions. For example, a metric expression can be computed as METRIC1=CALCULATED_DATA.ATTRIBUTE1+CALCULATED_DATA.ATTRIBUTE2. After performing the CALCULATE( ) implementation 312, the calculated values are stored in CALCULATED_DATA data structure. The plug-in engine 310 passes the calculated data to the workflow engine 304. The workflow engine 304 then continues interpreting the next statements in the SFTP workflow script 302 such as the creation of an output file 115. After interpreting the SFTP workflow script 302 the workflow engine 304 passes the output file 115 to the invoking data collector 108 which in turn sends the output file to the data aggregator 110 in the form of a response 116 at stage E. The response 116 contains information that references the output file 115. In an alternative, the response 116 contains the output file 115.

At stage F, the data aggregator 110 stores the processed data and/or computed values contained in the output file 115 in a storage device 126. The data aggregator 110 may normalize the data prior to storage. In this implementation, the storage device 126 is a third party Relational Database Management System (RDBMS).

At stage G, a reporting engine 128 requests data from the data aggregator 110 to use in generating a unified report 124.

At stage A2, the data aggregator 110 sends a request to the data collector 106 to collect data from the EMS server 124. An EMS collects data from at least one network device. Instead of the data collector 106 collecting data from several network devices one at a time, the data collector 106 may gather data from an EMS instead. The request also contains information that identifies the REST workflow script 136 because the EMS server 124 communicates with other devices and/or systems through the REST protocol. The data collector 106 gathers the data from the EMS server 124. Because the gathered data from the EMS is historical data, the data collector 106 parses the gathered data to determine the source (i.e. network device(s)) and/or time the data was actually collected from the network device(s) by the EMS before processing the gathered data. The data collector 106 then stores the processed data in an output file. The data collector sends a response to the data aggregator 110 referencing the output file.

At stage A3, the data aggregator 110 sends a request to the data collector 104 to gather data from the hybrid wireless modem 122. Data for some objects of the hybrid wireless modem 122 are accessible via SNMP while other object data are accessible via a non-SNMP protocol. In this example, the request contains information that identifies the SNMP workflow script 130 and the SFTP workflow script 132 for data collection. In another implementation, the request may identify one workflow script for all of the data collection. The data collector 104 returns an output file in the response to the data aggregator 110.

Figure 4:
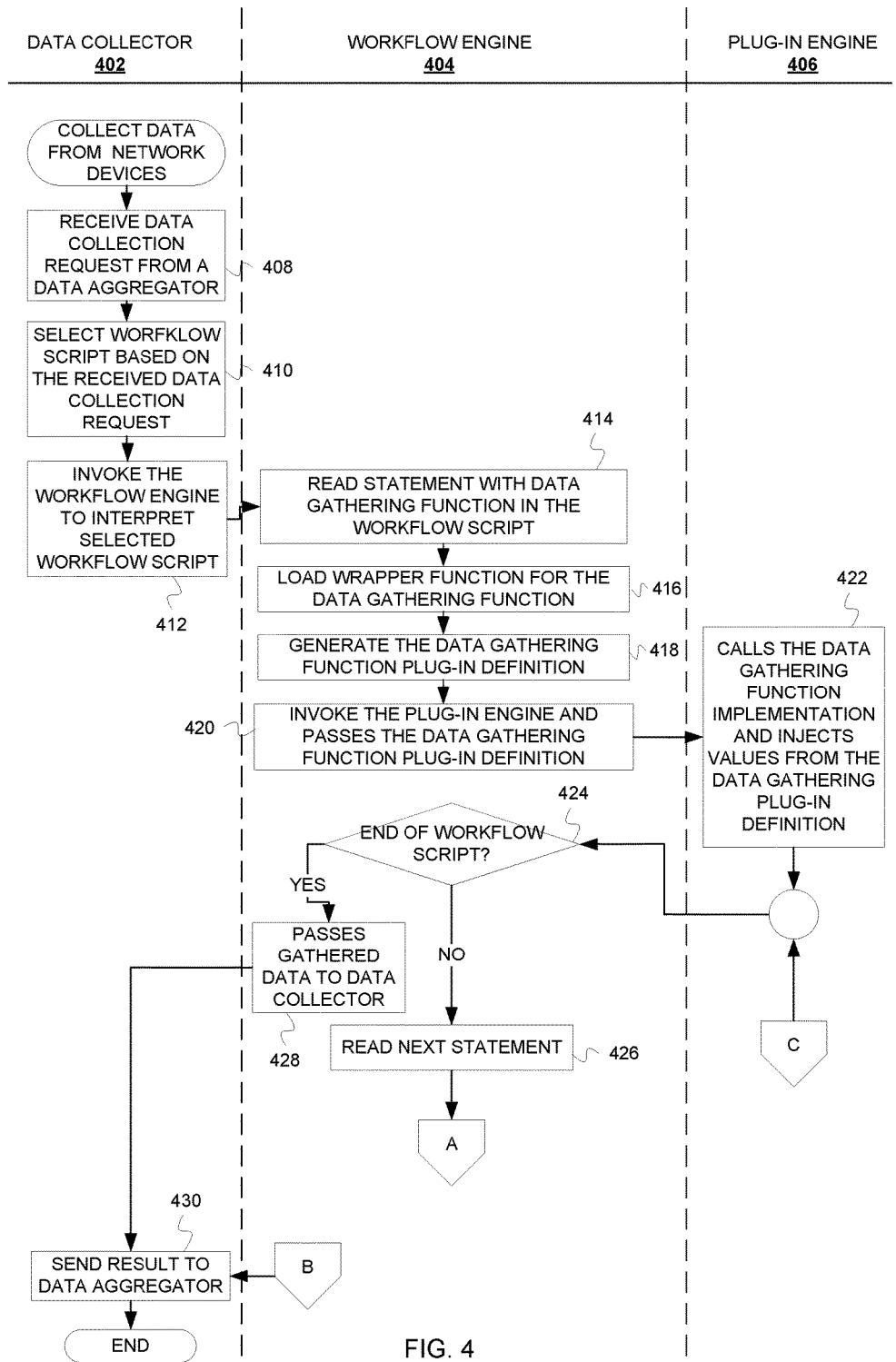
FIG. 4 is a flowchart of example operations for performing data collection leveraging a unified data collection workflow architecture.

FIG. 4 is a flowchart of example operations for performing data collection leveraging a unified data collection workflow architecture. The description in FIG. 4 refers to a data collector (402), a workflow engine (404), and a plug-in engine (406) performing the example operations for consistency with FIG. 1. The data collector (402), the workflow engine (404) and the plug-in engine (406) are part of a network management system that collects data from network devices.

As stated earlier, data collection may involve periodic data gathering from a network device(s), converting the gathered data and calculating metric expressions. Data gathering can be performed using various means such as using secure shell (SSH), file transfer protocol (FTP), etc. The gathered data may be used to determine metrics such as the network's health and performance (e.g., availability, throughput, bandwidth utilization, latency, error rates, and CPU utilization). Converting the gathered data may involve converting the file format containing the gathered data, normalizing the data and/or data structure to conform to the current network management system and/or ease of processing or uniformity. For example, data collected may be in a variety of formats (e.g., XML, CSV, JavaScript Object Notation (JSON), etc.), different data structures (e.g., array, record, graph, etc.) and/or. different numeric systems (e.g., Metric, English) and is converted from one numeric system to another. Calculating involves computing the values of the metric expressions.

The data collector 402 receives a data collection request from the data aggregator (408). The data collection request may contain a data collection request for a single network device or a set of network devices. The data aggregator may utilize the request-response paradigm when communicating with the data collector 402. The data aggregator communicates with the data collector 402 by way of communication protocols (e.g., Transmission Control Protocol/Internet Protocol (TCP/IP), User Datagram Protocol (UDP)).

After receiving the data collection request from the data aggregator, the data collector 402 selects a workflow script based on the data collection request (410). As stated earlier, the data collection request contains information that identifies the workflow script. The data collection request may explicitly identify the workflow script (e.g., filename, global identifier, etc.) or identify a device(s) and attribute(s) that the data collector 402 resolves to the workflow script (e.g., maintain/access configuration data that identifies protocols/technologies of devices in a managed network).

The data collector 402 invokes the workflow engine 404 to interpret the workflow script by calling the workflow engine 404 and passing the workflow script to the workflow engine 404 (412). The data collector 402 can be programmed to invoke a program (i.e., the workflow engine 404 program code) at a specified path in response to receipt of a data collection request. Embodiments can identify the location of the workflow engine 404 program code and the data collector 402 can execute based on the identified location. The data collector 402 may pass the workflow script by reference or by value.

Since the workflow engine 404 may receive several workflow script files for interpretation, the workflow engine 404 may have a scheduling system that prioritizes running of the incoming workflow scripts (e.g., "First In, First Out" (FIFO), Last In, First Out (LIFO)). The workflow engine 404 begins to interpret the received workflow script. The workflow engine 404 may interpret one workflow script at a time or several workflow scripts in parallel. The workflow script constitutes several individual statements that specify tasks to be performed. The tasks may be chained or independent. The workflow engine 404 monitors and coordinates the execution of the individual task in the workflow script.

The workflow engine 404 reads a data gathering statement in the workflow script (414). The data gathering statement corresponds to a plug-in for retrieving or requesting data from devices specified in the data collection request. The workflow engine 404 loads the wrapper function for the data gathering statement (416). The data gathering wrapper function encapsulates and provides an abstraction for the underlying data gathering function implementation. The workflow engine 404 then inspects and/or reflects on the data gathering wrapper function to get information on the data gathering wrapper function class, such as its variables, methods, constructors, fields, etc. The workflow engine 404 uses reflection and/or inspection, such as that provided by the Java Reflection application programming interface (API).

After determining information such as the variables used by the data gathering wrapper function, the workflow engine 404 generates the data gathering plug-in definition and injects the values for the inspected data in the generated data gathering plug-in definition (418). The generated plug-in definition is in the XML-format. In this example, the workflow engine 404 uses XQuery language when generating the plug-in definition. The workflow engine 404 can use other languages such as Scala to generate the plug-in definition.

The workflow engine 404 invokes the plug-in engine 406 and passes the data gathering function plug-in definition to the plug-in engine 406 (420). The workflow engine 404 can pass the data gathering function plug-in definition by reference or by value. Information such as the name and location of the data gathering implementation can be found in the data gathering plug-in definition. Other information such as the information on the data gathering implementation dependencies and values for variables can also be found on the data gathering plug-in definition.

The plug-in engine 406 calls the data gathering implementation and injects the values in the data gathering plug-in definition to the variables in the data gathering implementation (422). Similar to the workflow engine 404, the plug-in engine 406 uses reflection and/or inspection such as the Java Reflection to perform the injection. After the data gathering plug-in implementation completes, control is returned to the workflow engine 404 and the plug-in engine 406 passes the gathered data to the workflow engine 404. The plug-in engine 406 can pass the gathered data to the workflow engine 404 by reference to the location of the gathered data or by passing the values of the gathered data.

The workflow engine 404 determines if it is the end of the workflow script (424). The workflow engine 404 can determine the end of the workflow script by detecting if there is no additional statement. In other implementation, the workflow engine 404 determines the end of the workflow script by detecting an end of file marker or not detecting a new line, for example. If the workflow engine 404 determines that it is the end of the workflow script, the workflow engine 404 passes the gathered data to the data collector 402 (428). The workflow engine 404 can pass the gathered data by referencing its location or by passing the values of the gathered data. The values can be passed by passing the file or a data structure that contains the values for example. The data collector 402 then sends the gathered data to the data aggregator (430). Similarly, the data collector 402 can pass the gathered data by reference or by value.

Figure 5:
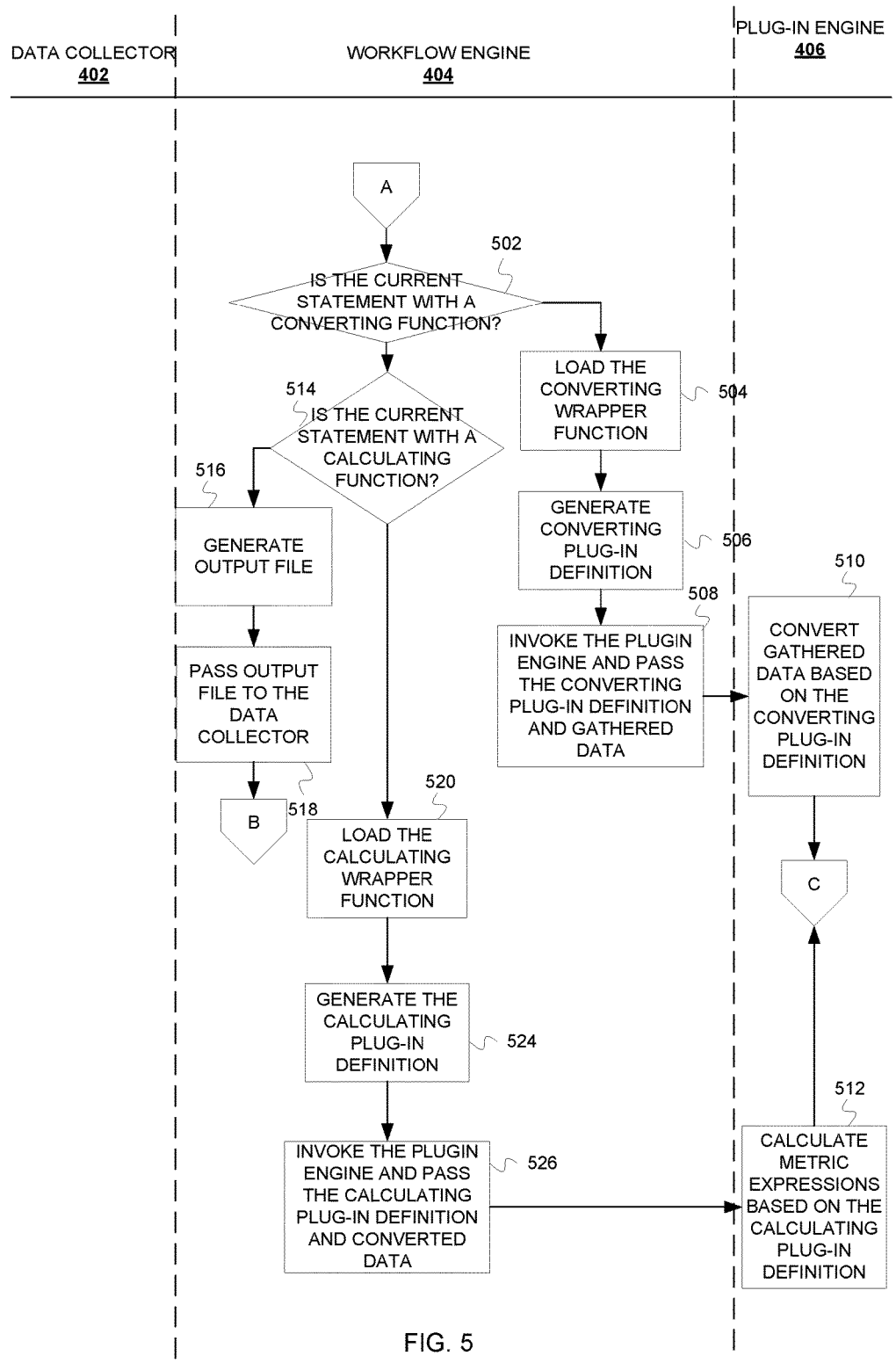
FIG. 5 is a continuation of FIG. 4 which is a flowchart of example operations for performing data collection leveraging a unified data collection workflow architecture.

If the workflow engine 404 determines that it is not the end of the workflow script, then the workflow engine 404 reads the next statement in the workflow script (426). FIG. 5 is a continuation of FIG. 4 which is a flowchart of example operations for performing data collection leveraging a unified data collection workflow architecture.

The workflow engine 404 determines whether the statement is either a converting function (502). If the statement is a converting function, then the workflow engine 404 then loads the converting wrapper function (504). The converting wrapper function encapsulates and provides an abstraction for the underlying converting function implementation. The workflow engine 404 then inspects and/or reflects on the converting wrapper function to get information on the converting wrapper function class, such as its variables, methods, constructors, fields, etc.

After determining information such as the variables used by the converting wrapper function, the workflow engine 404 generates the converting plug-in definition and injects the values for the determined variables in the generated converting plug-in definition (506).

The workflow engine 404 invokes the plug-in engine 406 and passes the converting function plug-definition and the gathered data to the plug-in engine 406 (508). The workflow engine 404 can pass the converting function plug-in definition and gathered data by reference or by value. Information such as the name and location of the converting implementation can be found in the converting plug-in definition. Other information such as the information on the converting implementation dependencies can also be found in the converting plug-in definition.

After generating the converting plug-in definition, the plug-in engine 406 calls the converting implementation and injects the values in the converting plug-in definition to the variables in the converting implementation (510). After the call, control is returned to the workflow engine 404 and the plug-in engine 406 passes the converted data to the workflow engine 404. The plug-in engine 406 can pass the converted data to the workflow engine 404 by reference to the location of the gathered data or by passing the values of the gathered data.

The workflow engine 404 then determines if it is the end of the workflow script (424). If the workflow engine 404 determines that it is not the end of the workflow script, then the workflow engine 404 reads the next statement in the workflow script (426). The workflow engine 404 determines whether the statement is a converting function (502). If the workflow engine 404 determines that the statement is not a converting function, then the workflow engine 404 determines if the statement is a calculating function (514).

If the workflow engine 404 determines that the statement is a calculating function, then the workflow engine 404 loads the wrapper function for the calculating function (520). The calculating wrapper function encapsulates and provides an abstraction for the underlying calculating function implementation. The workflow engine 404 then inspects the calculating wrapper function to get information on the calculating wrapper function class, such as its variables, methods, constructors, fields, etc.

After determining information such as the variables used by the calculating wrapper function, the workflow engine 404 generates the calculating plug-in definition and injects the values for the determined variables in the generated calculating plug-in definition (524).

After generating the calculating plug-in definition, the workflow engine 404 invokes the plug-in engine 406 and passes the calculating function plug-definition and the gathered data to the plug-in engine 406 (526). The workflow engine 404 can pass the calculating function plug-in definition and gathered data by reference or by value. Information such as the name and location of the calculating implementation can be found in the calculating plug-in definition. Other information such as the information on the calculating implementation dependencies and values for the variables can also be found in the calculating plug-in definition.

The plug-in engine 406 calls the calculating implementation and injects the values in the calculating plug-in definition to the variables in the calculating implementation (512). The calculating implementation computes the metric expressions in the workflow script. The metric expressions are computed using the attribute values. The values of the attributes could have been extracted from the gathered data or was the result of a computation. After the call, control is returned to the workflow engine 404 and the plug-in engine 406 passes the calculated data to the workflow engine 404. The plug-in engine 406 can pass the calculated data to the workflow engine 404 by reference to the location of the calculated data or by passing the values of the calculated data.

If the workflow engine 404 determines that the statement is not a calculating function, then the workflow engine 404 generates the output file (516). The generated output file complies with a format specified for consumption by the data collector. Hence, the output file can be considered "normalized" since data from various technologies and/or protocol have been unified into an output file with a specified format that can be consumed by the data collectors. The format can be specified in a schema definition or format specification and the definition or specification maintained in accordance with the maintenance of the data collectors. In some cases, a network monitoring/management system use different types of data collectors that accept different data formats. For scenarios of the heterogeneous network with heterogeneous data collectors, the different workflows can be defined for the different types of data collectors to accommodate the different format definitions/specifications. Embodiments can also use a different workflow definition to accommodate different data formatting for different types of collectors or embed the data formatting into the data collectors that consume a different format than the predominantly deployed data collectors.

The workflow engine 404 passes the output file to the data collector 402 (518) by reference or by value. The workflow engine 404 may pass an output file identifier to the data collector 402. Once the data collector 402 receives the output file, the data collector 402 then sends the output file to the data aggregator (430).

Variations

The above example illustrations presume that the data collection process against the network device is performed by the data collector. The data collector may also deploy software agents to each network device to act as remote probes. These remote probes can be used to monitor network devices within the same network or networks in other locations. The data aggregator may also collect data directly from network devices without the data collector.

The above example illustrations presume that the data collector is composed of one workflow engine and one plug-in engine. In other embodiments, the data collector may also be comprised of two or more workflow engines and two or more plug-in engines. These workflow engines and/or plug-in engines may be simultaneously processing one or more than one workflow scripts. For example, if a plug-in engine is busy, the workflow engine may call another plug-in engine to perform a function. In addition, the data collector may contain other processors such as a routing engine that receives and directs the workflow script(s) to the appropriate workflow engine, plug-in engine and/or processor(s).

The above illustrations presume that the plug-in engine is invoked directly from the workflow engine (i.e., invoked from the program instance interpreting a workflow definition) to execute a plug-in implementation. For instance, a plug-in engine can be written in the Java programming language and running in a Java Virtual Machine (JVM) to run a Java-based plug-in implementation within the JVM. In some embodiments, the workflow engine may access a plug-in implementation via a web service or a micro service. For example, the workflow engine can wrap a plug-in definition into a RESTful request and communicate the request to a web service. The web service processes the request and sends a response with a result back to the workflow engine. The workflow engine can extract the result of the web service and provide it to the data collector or perform additional processing, such as converting the result.

The above illustrations presume the computation of the metric expressions is performed by a function in a file external to the workflow script. In other embodiments, the computation of the metric expressions can be performed in the workflow script. Below is an example of a workflow script gathering data from an SNMP network device and then performing some calculations.

```
//Gather data from SNMP device(s)
data = snmptable(
        address: "138.42.96.5",
        oids: [
            ifDescr:      "1.3.6.1.2.1.2.2.1.2",
            ifInDiscards: "1.3.6.1.2.1.2.2.1.13",
            ifOutDiscards: "1.3.6.1.2.1.2.2.1.19"
        ]);
//Calculate metrics from gathered data
    calculated_data = withSnmptable(data.value){[
        Names: ifDescr + "-" + _index,      // metric "Names"
    Discards: ifInDiscards + ifOutDiscards       // metric "Discards"
        ]}
```

In the above workflow script, the first statement is a data gathering statement. The data gathering statement sends GET requests to SNMP-enabled devices for the specified OIDS of the network device specified by the address. An OID may be an index to a device definition, a device attribute, a 2-dimensional array of managed objects, etc. For this example, the OIDs are unique object identifiers that describe objects within a Management Information Base (MIB). More specifically, these example OIDs correspond to tables. SNMP-enabled devices provide responses with the values corresponding to the requested OIDs. For example, the OID ifDescr which corresponds to the OID value "1.3.6.1.2.1.2.2.1.2" returns the network interfaces of the network device. The OID ifInDiscards which corresponds to the OID value "1.3.6.1.2.1.2.2.1.13" returns the number of inbound packets which were chosen to be discarded. The OID ifOutDiscards which corresponds to the OID value "1.3.6.1.2.1.2.2.1.19" returns the number of outbound packets which were chosen to be discarded as well. The function snmptable( ) returns a list of values for each OID attribute. The returned list of values is contained in the data structure "data". "Data" is depicted as a table for illustration purposes. For example, the table "data" may look like:

|  | Instance 1 | Instance 2 |
| --- | --- | --- |
| ifDescr | "inf" | "inf" |
| ifInDiscards | 20 | 10 |
| ifOutDiscards | 30 | 15 |
| _index | 1 | 2 |

As depicted, the table "data" shows the OID values for the columns "Instance 1" and "Instance 2". "Instance 1" and "Instance 2" are Instance Identifiers (IID) of specific objects or instances. In the table "data" above, _index is a reserved variable to indicate the index of each instance or conceptual column in the table "data" starting at 1.

The workflow script further includes a calculate function withSnmptable( ) which contains the metric expression variables "Names" and "Discards"). The metric expression variable "Names" is assigned a concatenation of an interface description and a current index. The metric expression variable "Discards" is assigned a value from a metric expression for the total number of discarded packets whether inbound or outbound for each of the network interfaces ("Names") retrieved by the OID ifDescr. As depicted above, the function withSnmptable( ) calculates the metric expressions "Names" and "Discards" using the data structure "data" as an input. The function withSnmptable( ) returns the calculated values for each instance in the "data" table. The returned calculated values or output of the function withSnmptable( ) is contained in the data structure "calculated_data", depicted as a table for illustration purposes. For example, the table "calculated_data" may look like:

|          | Instance 1 | Instance 2 |
|----------|------------|------------|
| Names    | "inf-1"    | "inf-2"    |
| Discards | 50         | 25         |

The above table "calculated_data" contains the calculated values for instances "Instance 1" and "Instance 2". The instance "Instance 1" contains the value "inf-1" and 50 for the metric expression variables "Names" and "Discards" respectively. The value "inf-1" was generated from appending the character "-" and the value "1" of the "_index" to the value "inf" returned by the OID "ifDescr". The value of 50 for "Discards" was calculated from adding the values 20 of "ifInDiscards" and 30 of "ifOutDiscards".

The above example illustrations presume that the storage device is a third-party RDBMS. In another implementation, the data aggregator may store the output file in a file server or a no-SQL database. The above illustrations also presume that the data is either stored raw and/or normalized. In another implementation, the data aggregator may aggregate the data collected (e.g. aggregating data from several routers) prior to storing the data in the storage device.

The above example illustrations presume that the data aggregator returns the queried data from the storage device to the reporting engine. In other implementations, the data aggregator may perform calculations and/or aggregate data retrieved from the storage device 130 prior to responding to the request of the reporting engine. In yet other implementations, the data aggregator may request a data collector(s) for additional data.

The illustrations refer to collecting data from network devices. Collecting data from network devices utilizes the pull model. The pull model is based on the request/response paradigm, typically used to perform data polling. However, the unified data collection principles and processes depicted may be applied to a push model such as the Java Message Service (JMS). The push model may rely on the publish/subscribe/distribute paradigm. In the push model, the network devices publish events or data available for subscription. Upon subscribing, the network management system receives data or messages from the network devices. Messages with values for the attributes may be distributed on a schedule. Messages may be distributed in various formats such as in an XML document or via packets. A data collector that uses the push model may use the JMS workflow script 134 in FIG. 1 for example.

The data storage or repository may be independent of the network management system. In this disclosure, the data is stored in a third party RDBMS but other technologies may be used to store the data, such as plain text file. The data storage in this illustration is a machine that hosts the database. Various methodologies to store and retrieve the data such as an interface (e.g., Java Database Connectivity (JDBC)) may be used.

The examples often refer to a "data collector". The data collector is a construct used to refer to the implementation of functionality for collecting and evaluating data from network devices. This construct is utilized since numerous implementations are possible. A data collector can be given any moniker depending on the platform, programming language, programmer preference, etc. In addition, the functionality attributed to a "data collector" can be distributed across different components, whether software or hardware components. For instance, a dedicated co-processor or application specific integrated circuit can perform arithmetic calculations of the metric expressions.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel, and the operations may be performed in a different order. For example, the workflow engine can interpret several workflow scripts simultaneously by leveraging several plug-in engines. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of the platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or a combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object-oriented programming language such as the Java programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
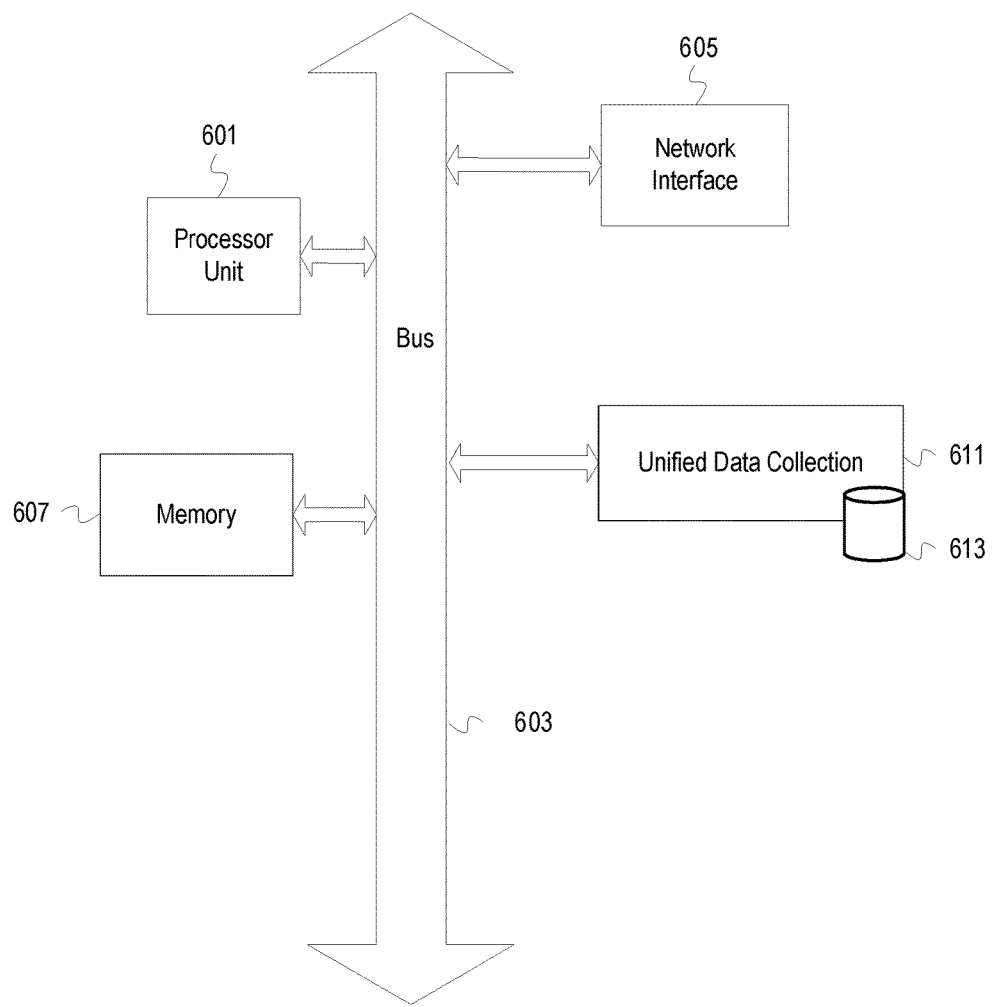
FIG. 6 depicts an example computer system with a unified data collection workflow architecture.

FIG. 6 depicts an example computer system with a unified data collection workflow architecture. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes unified data collection system 611 and a database 613. The unified data collection system 611 collects and evaluates data from network devices. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for data collection and evaluation as described herein may be implemented with facilities consistent with any hardware system or hardware systems. Many variations, modifications, additions and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The description refers to a workflow engine and a plug-in engine. An "engine" refers to a program instance that carries a task or tasks dispatched from another program instance that calls, instantiates, or invokes the engine. State information is maintained for the engine to return a task result to the program instance that dispatched the task. A context switch may occur between the dispatching program instance and the engine. Instead of a context switch, the dispatching program instance may maintain information to track the state of the dispatched task and continue performing other operations, such as dispatching another task to the engine or another engine.

The description specifies two different engines: a "workflow engine" and a "plug-in engine." These different engines operate at different levels of abstraction of the data collection workflow. A data collector dispatches a data collection task(s) to the workflow engine by indicating a workflow definition. The workflow engine then performs the task(s) indicated in the workflow by invoking the plug-in engine, although a workflow definition can include statements directly interpreted by the workflow engine without involvement from the plug-in engine. As illustrated in the examples, a workflow engine may dispatch the gathering and converting data collection tasks to a plug-in engine while performing some metric calculations that are expressed explicitly in the workflow definition. The plug-in engine performs a task dispatched from the workflow engine and returns a result to the plug-in engine, although the workflow definition can specify an output destination instead of the plug-in engine returning a result (output) to the workflow engine. However, the plug-in engine at least indicates completion of a dispatched task to the workflow engine.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   a data collector determining a workflow definition in response to receipt of a data collection request and indicating the workflow definition to a workflow engine, wherein the workflow definition comprises statements that comprise a set of one or more abstracted data collection tasks;
   the workflow engine generating a data gathering task definition based, at least in part, on a data gathering statement in the workflow definition and a data gathering wrapper identified by the data gathering statement;
   the workflow engine indicating the data gathering task definition to a plug-in engine;

the plug-in engine instantiating a data gathering task implementation based, at least in part, on the data gathering task definition to gather data from a set of one or more network devices indicated in the data gathering task definition and writing an output from the data gathering task implementation as indicated in the data gathering task definition;

the plug-in engine indicating completion of the data gathering task implementation to the workflow engine; and the workflow engine indicating workflow completion to the data collector after the workflow engine completes processing of the workflow definition.

2. The method of claim 1, further comprising:
the workflow engine detecting a data conversion task statement in the workflow definition and generating a data conversion task definition based, at least in part, on the data conversion statement and a data conversion wrapper identified by the data conversion statement;
the workflow engine indicating to the plug-in engine the data conversion task definition;
the plug-in engine instantiating a data conversion task implementation based, at least in part, on the data conversion task definition and writing an output from the data conversion task implementation as indicated in the data conversion task definition; and
the plug-in engine indicating completion of the data conversion task implementation to the workflow engine.

3. The method of claim 1, further comprising:
the workflow engine detecting a data calculation task statement in the workflow definition and generating a data calculation task definition based, at least in part, on the data calculation statement and a data calculation wrapper identified by the data calculation statement;
the workflow engine indicating to the plug-in engine the data calculation task definition;
the plug-in engine instantiating a data calculation task implementation based, at least in part, on the data calculation task definition and writing an output from the data calculation task implementation as indicated in the data calculation task definition; and
the plug-in engine indicating completion of the data calculation task implementation to the workflow engine.

4. The method of claim 1, wherein generating the data gathering task definition comprises:
injecting variable values from the data gathering statement into the data gathering wrapper according to variable mappings indicated in the data gathering wrapper, wherein the variable mappings map variables specified in the data gathering statement to variables specified in the data gathering wrapper.

5. The method of claim 1, wherein the data gathering task definition indicates a destination for output.

6. The method of claim 1 further comprising:
the data collector receiving the data collection request, wherein the data collection request indicates the set of one or more network devices.

7. The method of claim 1, wherein the workflow definition is in an expression programming language.

8. The method of claim 1, wherein the data collector determining the workflow definition comprises:
the data collector determining that the workflow definition corresponds to a set of one or more protocols indicated in the data collection request.

9. The method of claim 8, wherein the data collector indicating the workflow definition comprises the data collector indicating a first workflow definition identifier of a plurality of workflow definition identifiers to the workflow engine.

10. One or more non-transitory machine-readable media comprising program code for a workflow based abstracted data collection architecture for a heterogeneous network, the program code comprising:
first program code to select a workflow definition from a plurality of workflow definitions based, at least in part, on a data collection request that indicates a set of one or more managed network devices, wherein each of the workflow definitions comprises a series of abstracted data collection task statements that at least include an abstracted data gathering statement;
second program code to
generate, for each abstracted data collection task statement in the selected workflow definition, a task definition based, at least in part, on a wrapper function identified by the abstracted data collection task statement and program variable values indicated in the abstracted data collection statement, and
indicate each generated task definition to an instance of a third program code; and
the third program code to
load, for each indicated task definition, a data collection task plug-in identified by the indicated task definition;
run the loaded plug-in with variable values of the indicated task definition; and
write output generated from running the loaded plug-in as indicated in the indicated task definition.

11. The non-transitory machine-readable media of claim 10, wherein the second program code to generate a task definition comprises program code to:
read variable mappings in the wrapper function identified by the abstracted data collection task statement, wherein the variable mappings map variables indicated in the abstracted data collection task statement to variables indicated in the wrapper function; and
assign values assigned to the variables indicated in the abstracted data collection task statement to the variables indicated in the wrapper function according to the variable mappings.

12. A network management system comprising:
a plurality of computing devices to manage devices of a network, each of the plurality of computing devices comprising a processor and a machine-readable medium having data collector program code, workflow engine program code, and plug-in engine program code;
the data collector program code is executable by the processor to cause a computing device to determine a workflow definition in response to receipt of a data collection request and to indicate the workflow definition to the workflow engine program code, wherein the workflow definition comprises statements that comprise a set of one or more abstracted data collection tasks;
the workflow engine program code is executable by the processor to cause a computing device to,
generate a data gathering task definition based, at least in part, on a data gathering statement in the workflow definition and a data gathering wrapper identified by the data gathering statement, indicate the data gathering task definition to the plug-in engine program code, indicate workflow completion to the data collector program code after completion of the workflow definition; and the plug-in engine program code is executable by the processor to cause a computing device to, instantiate a data gathering task implementation based, at least in part, on the data gathering task definition to gather data from a set of one or more network devices indicated in the data gathering task definition, write an output from the data gathering task implementation as indicated in the data gathering task definition, and indicate completion of the data gathering task implementation to the workflow engine program code.

13. The network management system of claim 12, wherein:

the workflow engine program code is further executable by the processor to cause the computing device to, detect a data conversion task statement in the workflow definition and generate a data conversion task definition based, at least in part, on the data conversion statement and a data conversion wrapper identified by the data conversion statement, indicate to the plug-in engine program code the data conversion task definition; and the plug-in engine program code is further executable by the processor to cause the computing device to, instantiate a data conversion task implementation based, at least in part, on the data conversion task definition and write an output from the data conversion task implementation as indicated in the data conversion task definition, indicate completion of the data conversion task implementation to the workflow engine program code.

14. The network management system of claim 12, wherein:

the workflow engine program code is further executable by the processor to cause the computing device to, detect a data calculation task statement in the workflow definition and generate a data calculation task definition based, at least in part, on the data calculation statement and a data calculation wrapper identified by the data calculation statement, indicate to the plug-in engine program code the data calculation task definition; and the plug-in engine program code is further executable by the processor to cause the computing device to, instantiate a data calculation task implementation based, at least in part, on the data calculation task definition and write an output from the data calculation task implementation as indicated in the data calculation task definition, and indicate completion of the data calculation task implementation to the workflow engine program code.

15. The network management system of claim 12, wherein the workflow engine program code to generate the data gathering task definition comprises the workflow definition program code to:

inject variable values from the data gathering statement into the data gathering wrapper according to variable mappings indicated in the data gathering wrapper, wherein the variable mappings map variables specified in the data gathering statement to variables specified in the data gathering wrapper.

16. The network management system of claim 12, wherein the data gathering task definition indicates a destination for output.

17. The network management system of claim 12, wherein:

the data collector program code is executable by the processor to cause the computing device to receive the data collection request, wherein the data collection request indicates the set of one or more network devices.

18. The network management system of claim 12, wherein the workflow definition is in an expression programming language.

19. The network management system of claim 12, wherein the data collector program code to determine the workflow definition comprises the data collector program code to:

determine which of a plurality of workflow definitions corresponds to a set of one or more protocols indicated in the data collection request.

20. The network management system of claim 19, wherein the data collector program code to indicate the workflow definition comprises the data collector program code to indicate a first workflow definition identifier of a plurality of workflow definition identifiers to the workflow engine program code.

* * * * *